(12) United States Patent
Itagaki et al.

(10) Patent No.: US 11,289,115 B1
(45) Date of Patent: Mar. 29, 2022

(54) COPYING A STORAGE TAPE (71) Applicant: International Business Machines Corporation, Armonk, NY (US)

(72) Inventors: Hiroshi Itagaki, Yokohama (JP); Shinsuke Mitsuma, Tokyo (JP); Tsuyoshi Miyamura, Yokohama (JP); Noriko Yamamoto, Tokyo (JP); Tohru Hasegawa, Tokyo (JP); Atsushi Abe, Ebina (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/347,634

(22) Filed: Jun. 15, 2021

(51) Int. Cl.
*G11B 5/09* (2006.01)
*G11B 5/012* (2006.01)
*G11B 20/10* (2006.01)

(52) U.S. Cl.
CPC .............. *G11B 5/012* (2013.01); *G11B 20/10* (2013.01)

(58) Field of Classification Search
None
See application file for complete search history.

(56) References Cited

U.S. PATENT DOCUMENTS

| | | | | |
|---|---|---|---|---|
| 7,660,790 | B1 * | 2/2010 | Batterywala | G06F 16/10 707/999.005 |
| 8,675,296 | B2 | 3/2014 | Amir et al. | |
| 9,513,804 | B2 | 12/2016 | Enohara et al. | |
| 9,733,871 | B1 | 8/2017 | Burgoyne et al. | |
| 2005/0065961 | A1 * | 3/2005 | Aguren | G06F 16/10 |
| 2007/0094448 | A1 * | 4/2007 | Reasoner | G11B 15/68 711/115 |
| 2008/0243958 | A1 * | 10/2008 | Prahlad | G06F 11/1453 |
| 2009/0259701 | A1 * | 10/2009 | Wideman | G06F 16/1727 |
| 2013/0271865 | A1 * | 10/2013 | Amir | G11B 5/86 360/15 |
| 2015/0301906 | A1 * | 10/2015 | Crockett | G06F 11/2074 714/19 |
| 2015/0347034 | A1 * | 12/2015 | Whitney | G06F 3/0613 711/111 |
| 2016/0062671 | A1 * | 3/2016 | Iwasaki | G06F 16/11 707/640 |
| 2016/0170681 | A1 * | 6/2016 | Hasegawa | G06F 3/0686 711/111 |
| 2017/0123672 | A1 | 5/2017 | Freitag et al. | |
| 2019/0079690 | A1 * | 3/2019 | Asmussen | G06F 3/0641 |
| 2020/0341694 | A1 * | 10/2020 | Hasegawa | G06F 3/0604 |

FOREIGN PATENT DOCUMENTS

JP 2001290713 A 10/2001

* cited by examiner

*Primary Examiner* — Peter Vincent Agustin
(74) *Attorney, Agent, or Firm* — Donald J. O'Brien (57) ABSTRACT

Embodiments are disclosed for a method. The method includes generating a file list of an original source tape. The file list identifies files that are stored on the original source tape. The method further includes determining a number of possible parallel copies for a data storage system having multiple tape drives. The method additionally includes generating multiple tape file lists. Each of the tape file lists identify copies of the files stored on one of multiple source tapes. Further, the method includes generating multiple new copies of the files by copying, in parallel, a subset of the files, and a subset of the copies, based on the tape files lists, and using a first of the tape drives, and a second of the tape drives.

20 Claims, 5 Drawing Sheets

COPYING A STORAGE TAPE

BACKGROUND

The present disclosure relates to storage tape, and more specifically, to copying a storage tape.

Data storage systems can perform different types of copy operations that involve tape storage media (e.g., tape). One example of a copy operation results from a migrate command in the data storage system. Executing a migrate command can involve copying a substantive portion (e.g., the body) of a file from disk storage to tape, leaving a stub of the file on disk. Another example of a copy operation is a data migrate command in the data storage system. Executing the data migrate command can involve making a copy of an entire tape onto one or more other tapes.

SUMMARY

Embodiments are disclosed for a method. The method includes generating a file list of an original source tape. The file list identifies files that are stored on the original source tape. The method further includes determining a number of possible parallel copies for a data storage system having multiple tape drives. The method additionally includes generating multiple tape file lists. Each of the tape file lists identify copies of the files stored on one of multiple source tapes. Further, the method includes generating multiple new copies of the files by copying, in parallel, a subset of the files, and a subset of the copies, based on the tape files lists, and using a first of the tape drives, and a second of the tape drives.

Further aspects of the present disclosure are directed toward systems and computer program products with functionality similar to the functionality discussed above regarding the computer-implemented method. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

As stated previously, data storage systems can perform different types of copy operations involving tape, including migrate and data migrate commands. Additionally, data storage systems can include a reclaim command, which can re-use an area of tape storing data that is marked for deletion. However, tape storage is sequential, meaning that data storage systems write to tapes sequentially. Writing tapes sequentially can mean that the data storage system is restricted to writing files to the area of tape following the last storage block written to that tape. In other words, the data storage system is restricted to appending data to the end of the sequential data recorded on the tape medium. Accordingly, even if there is a re-usable area in the middle of the tape, the data storage system may not be able to reuse the area at the time of command execution. Thus, in order to make more efficient use of the tape, e.g., re-use the tape from beginning to end, the data storage system may copy all the valid files on the tape to other tapes, and re-claim the newly available space on the tape. In this way, the data storage system can begin sequentially re-writing the original tape from beginning with new data, without wasting unclaimed space.

With respect to executing the data migrate command, the data storage system can move data stored on previous generations of tape storage media from their original tapes to newer generations of tape that may, for example, have relatively higher data capacity. In some scenarios, most of the capacity of the original tapes can store valid files. While storing less capacity than their newer generation counterparts, these previous generation tapes can still tie up tape drives for ten or more hours while the data storage system sequentially copies all the valid files on the tape. Additionally, some data storage systems can consume additional time to perform file system overhead and consistency checks. As such, it can be challenging for the data storage system to manage its numerous other responsibilities when one of its tape drives is occupied for such a long period to execute just one migration command.

Accordingly, some embodiments of the present disclosure can enable data storage systems to reduce the amount of time to copy of all files on a specific tape to one or more other tapes. More specifically, some embodiments of the present disclosure can identify the files (e.g., source files) currently stored on a source tape that is selected for copying to another tape. In addition to copying source files from the source tape, some embodiments of the present disclosure can copy "copies" of the source files stored in other storage locations in parallel with the source tape copy.

In this way, some embodiments of the present disclosure can improve the operation of tape drives, and the various computer processing and/or other systems that use tape drives, by reducing the amount of time that the data storage system takes to make a copy of a storage tape. Further, by making copies of tapes more readily available, some embodiments of the present disclosure can improve the ability of data storage systems to also make re-usable tapes more readily available. Accordingly, the data storage system can make more efficient use of tape storage by reducing the number of tapes having unclaimed and wasted space.

Figure 1:
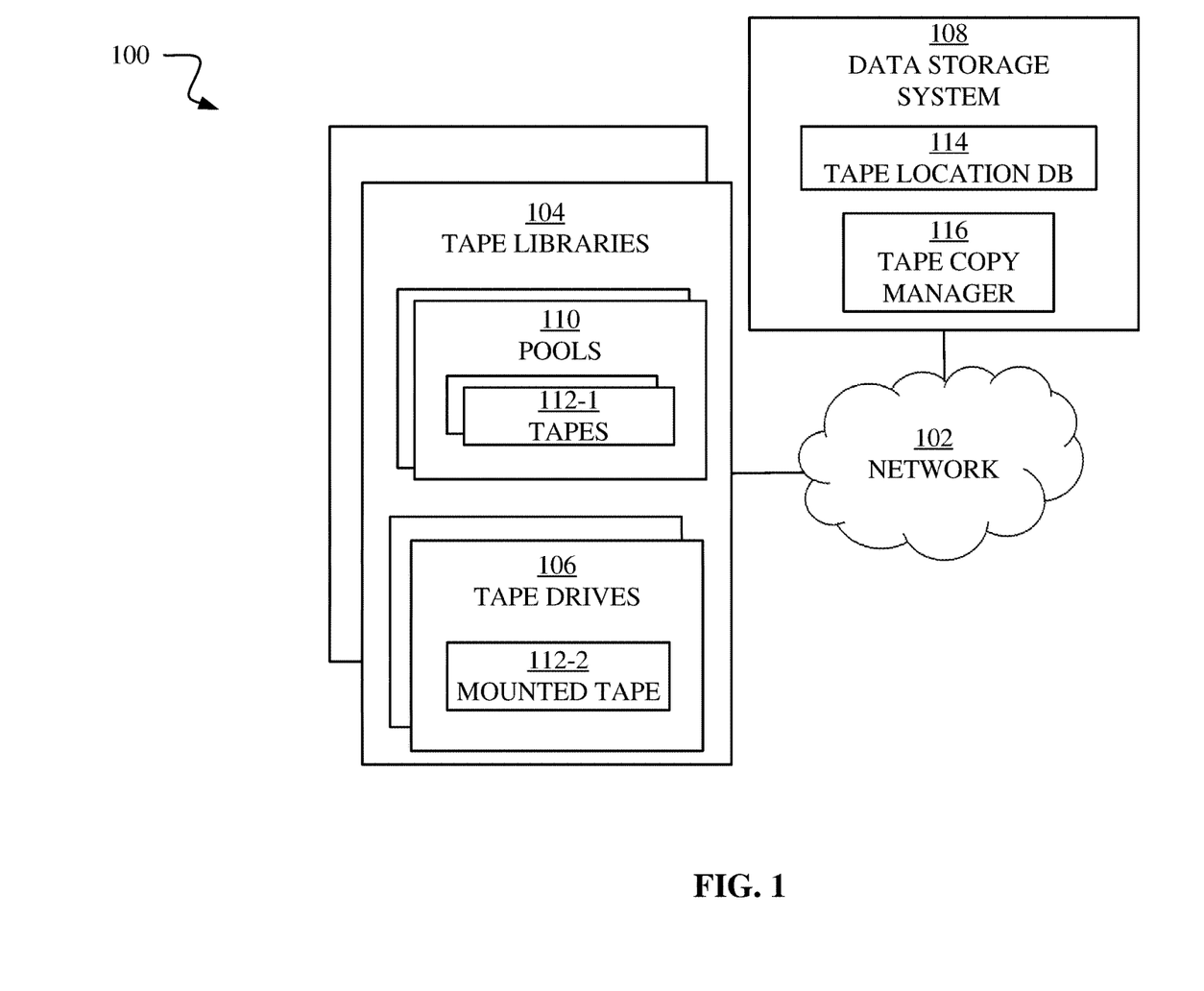
FIG. 1 is a block diagram of an example system for copying a storage tape, in accordance with some embodiments of the present disclosure.

FIG. 1 is a block diagram of an example system 100 for copying a storage tape, in accordance with some embodiments of the present disclosure. The system 100 includes a network 102, tape libraries 104, and data storage system 108. The network 102 may be a local area network, wide area network, or collection of computer communication networks that facilitates communication between components of the system 100, specifically, between the tape libraries 104, tape drives 106, and data storage system 108. In some embodiments, the network 102 can be the Internet.

The tape libraries 104 include tape drives 106 and pools 110 of tapes 112-1. The tapes 112-1 can be magnetic tape storage devices. The tape libraries 104 and pools 110 are organizational structures for the track and use of the tapes 112-1. In some cases, the tape libraries 104 and pools 110 can be distinguished based on the respective computer systems that use the tapes 112-1. Additionally, the tape libraries 104 and pools 110 can be distinguished based on geographic location where the tapes 112-1 are housed.

The tape drives 106 can be electronic devices that can read and write a mounted tape 112-2. The mounted tape 112-2 can be one of the tapes 112-1 mounted on a tape drive 106. The data storage system 108 can include systems and/or processes for mounting individual mounted tapes 112-2 to a tape drive 106.

The data storage system 108 can manage data storage for one or more computer systems (not shown). Data storage can involve reading and writing data to various types of computer-readable media, such as, flash, disk, and tapes 112-1, for example. In some embodiments of the present disclosure, the data storage system 108 can use a linear tape file system (LTFS) (not shown) to enable the effective use of the capacity of a disk (not shown). More specifically, the data storage system 108 can use the LTFS to maintain copies on tape media, of files currently stored on disk media, for example. In some cases, the data storage system 108 can maintain metadata about the file on disk, and body data (e.g., the actual data provided to a user) on a tape 112-1. The metadata can be information that describes the file and/or the contents thereof. To record the body data onto tape 112-1, the data storage system 108 can periodically migrate data from disk to tape. Accordingly, a migrate command of the data storage system 108 can identify a recording destination pool, e.g., pool 110 that can include a group of tapes 112-1, any of which the data storage system 108 can store the body data. Thus, upon reception of the migrate command, the data storage system 108 can select a tape 112-1 from the pool 110, mount the tape 112-1 on the tape drive 106 and record the body data of the files on the mounted tape 112-2. Further, the data storage system 108 can perform the migrate command for the same file multiple times.

However, in some cases, the recording destination can include multiple pools 110. Further, the data storage system 108 can select the tape(s) 112-1 based on performance and efficiency parameters. As such, as multiple migrations occur for the same source file and the same destination pool(s), the tape 112-1 selected to store the data may be different for each migration. Thus, the same file can be copied on multiple tapes 112-1 in different pools. However, the data storage system 108 may not keep multiple copies of the same file on multiple tapes in the same pool 110. Thus, when the destination of multiple migrate commands includes multiple pools 110, each pool 110 may have a copy of the file. However, the data storage system 108 may limit the number of copies in each pool 110 to one. Further, the data storage system 108 can keep track of the tapes 112-1 storing the file copies by using extended attributes on the file in disk. Additionally, or alternatively, the data storage system 108 can use a tape location database 114 on which tape 112-1 a specific file is recorded. The tape location database 114 can be a local and/or remote datastore capable of mapping files to the tapes 112-1 that store their corresponding copies. In some embodiments of the present disclosure, the tape location database 114 can include an index based on the file name and/or other file identifier.

Accordingly, the data storage system 108 can include a tape copy manager 116 that can reduce the amount of time the data storage system 108 takes to make a copy of a tape 112-1. More specifically, making a copy of a tape 112-1 can involve copying all the valid files on the tape 112-1 onto one or more other tapes 112-1. The valid files can include the files stored on the tape that are still accessible to users of the data storage system 108. Thus, the tape copy manager 116 can identify all the valid files on a tape 112-1 selected for copying (source tape), by using the tape location database 114. Further, in addition to copying files from the source tape, the tape copy manager 116 can copy, in parallel, files on the source tape that have copies on other tapes 112-1. In this way, the tape copy manager 116 can make a copy of the source tape in a shorter period of time than possible in current systems that make tape copies.

Figure 2A:
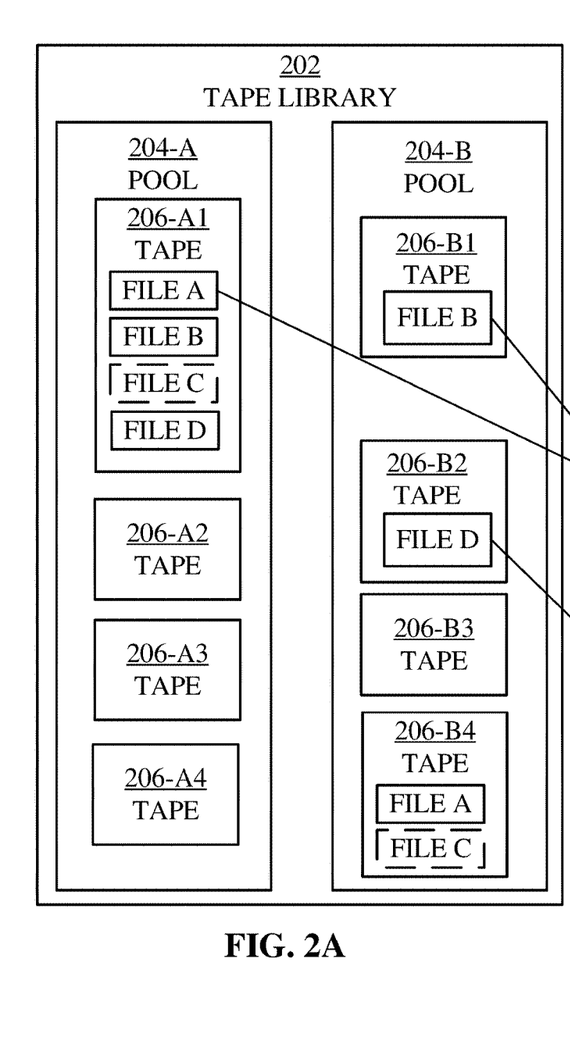
FIG. 2A is a block diagram of an example tape library before copying a storage tape, in accordance with some embodiments of the present disclosure.
Figure 2B:
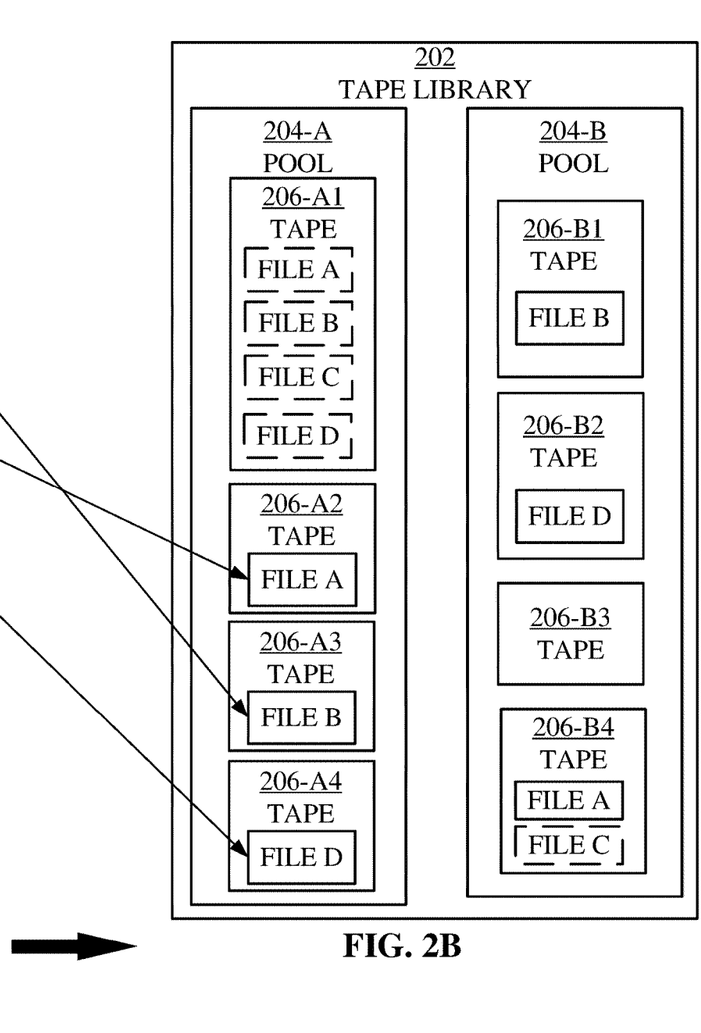
FIG. 2B is a block diagram of an example tape library after copying a storage tape, in accordance with some embodiments of the present disclosure.

FIGS. 2A and 2B are block diagrams of an example tape library 202 respectively, before and after copying a storage tape, in accordance with some embodiments of the present disclosure. The large arrow between FIGS. 2A and 2B represents the transition from the respective before and after states. The small arrows between FIGS. 2A and 2B are described in greater detail below.

An example data storage system, such as the data storage system 108, described with respect to FIG. 1, can store four files in two pools 204-A, 204-B (referred to collectively as pools 204) of a tape library 202. The tape library 202, and pools 204, can be respectively similar to the tape libraries 104, and pools 110. The pools 204-A, 204-B can respectively store, tapes 206-A1 through tapes 206-A4, and tapes 206-B1 through tapes 206-B4. While tapes 206-A2, A3, A4, in pool 204-A and tape 206-B3 in pool 204-B do not contain any files, tape 206-A1 in pool 204-A contains FILE A, FILE B, FILE C, and FILE D, collectively referred to as FILES. The FILES A, B, C, D are represented as solid and dash-lined boxes, to indicate their validity. More specifically, a solid-lined FILE indicates the FILE is valid, and thus, users of the data storage system 108 can read and write data respectively from, and to, FILES A, B, and D. In contrast, a dash-lined box indicates the FILE is not valid, e.g., invalid. An invalid FILE can be a file that a user of the data storage system 108 deletes. For a deleted file, the data storage system 108 may not erase the stored data, but instead indicate the file is deleted in an index. The data storage system 108 may read this index and prevent users of the data storage system 108 from accessing the deleted file, which can make the deleted file functionally deleted. For example, the data storage system 108 may not provide users access to FILE C.

As stated previously, the data storage system 108 can write to tapes 206 sequentially, which means further storage on the tape 206-A1 is appended to the last used byte of storage. As such, the data storage system cannot re-use the storage space occupied by FILE C. Thus, this storage space is essentially a wasted resource. Further, having numerous tapes 206 with such wasted space can be relatively large in the aggregate, potentially incurring costs for additional tapes to compensate for the lost storage. Further, tapes 206 can be housed in storage facilities, meaning additional tapes can incur additional costs in rent, utilities, maintenance, and the like. As such, it may be useful to reduce the number of tapes 206 in a data storage system by re-claiming the unused space on tapes 206 by copying all valid files from tapes with wasted space to other tapes. Making these new copies available would thus make it possible to invalidate, e.g., delete, all the files from the copied tapes, and make the copied tapes available for full sequential storage again.

Accordingly, in order to make the tape 206-A1 available for full sequential storage again, and thus re-claim the wasted space of FILE C, a tape copy manager, such as, the tape copy manager 116, can copy FILE A, FILE B, and FILE D to other tapes. Further, the tape copy manager 116 can invalidate FILES A, B, D on tape 206-A1. In this way, the tape copy manager 116 can make tape 206-A1 available to store a new set of files, thus freeing up the storage space of FILE C on tape 206-A1 that would otherwise go unused.

As stated previously, some files of the data storage system 108 can be copied on multiple tapes. For example, tapes 206-B1 and 206-B2 can also include copies of FILE B and FILE D, respectively. Additionally, tape 206-B4 includes copies of FILE A and FILE C. Accordingly, to reduce the costs, time, and other resources involved in sequentially copying all the valid FILES from tape 206-A1 to make the tape 206-A1 available for re-use, the tape copy manager 116 can copy FILES A, B, and D, in parallel to other tapes 206 in the same storage pool 204-A. More specifically, as indicated by the arrows from FIG. 2A to FIG. 2B, the tape copy manager 116 can copy, in parallel, FILE A from tape 206-A1 to tape 206-A2; FILE B from tape 206-B1 to tape 206-A3; and FILE D from tape 206-B2 to tape 206-A4.

Thus, while the copied FILES are stored on separate tapes 206, the FILES remain in the same pool 204-A. Additionally, the tape copy manager 116 can confirm that the FILES are correctly copied. If the tape copy manager 116 confirms that the FILES in the copy destinations, e.g., tapes 206-A2 through A4, are copied correctly, the tape copy manager 116 can invalidate FILES A, B, D on tape 206-A1. In this way, the tape copy manager 116 can copy all the valid files on tape 206-A1 to the other tapes, and therefore, the data stored on tape 206-A1 becomes redundant, and the data storage system 108 can reuse tape 206-A1.

While this example uses the same destination pool as the source pool, in some embodiments of the present disclosure, the tape copy manager 116 can copy tapes 206 to a different destination pool from the source pool. In this way, the tape copy manager 116 can facilitate copying files from older generation storage tapes to newer generation storage tapes, for example.

Further, some data storage systems 108 can limit the number of pools storing copies of the same file. While for the sake of simplicity, this example uses a data storage system having two pools 204, each pool having four tapes 206, in some embodiments, the data storage system 108 can have three or more pools, each having any number of tapes 206.

Figure 3:
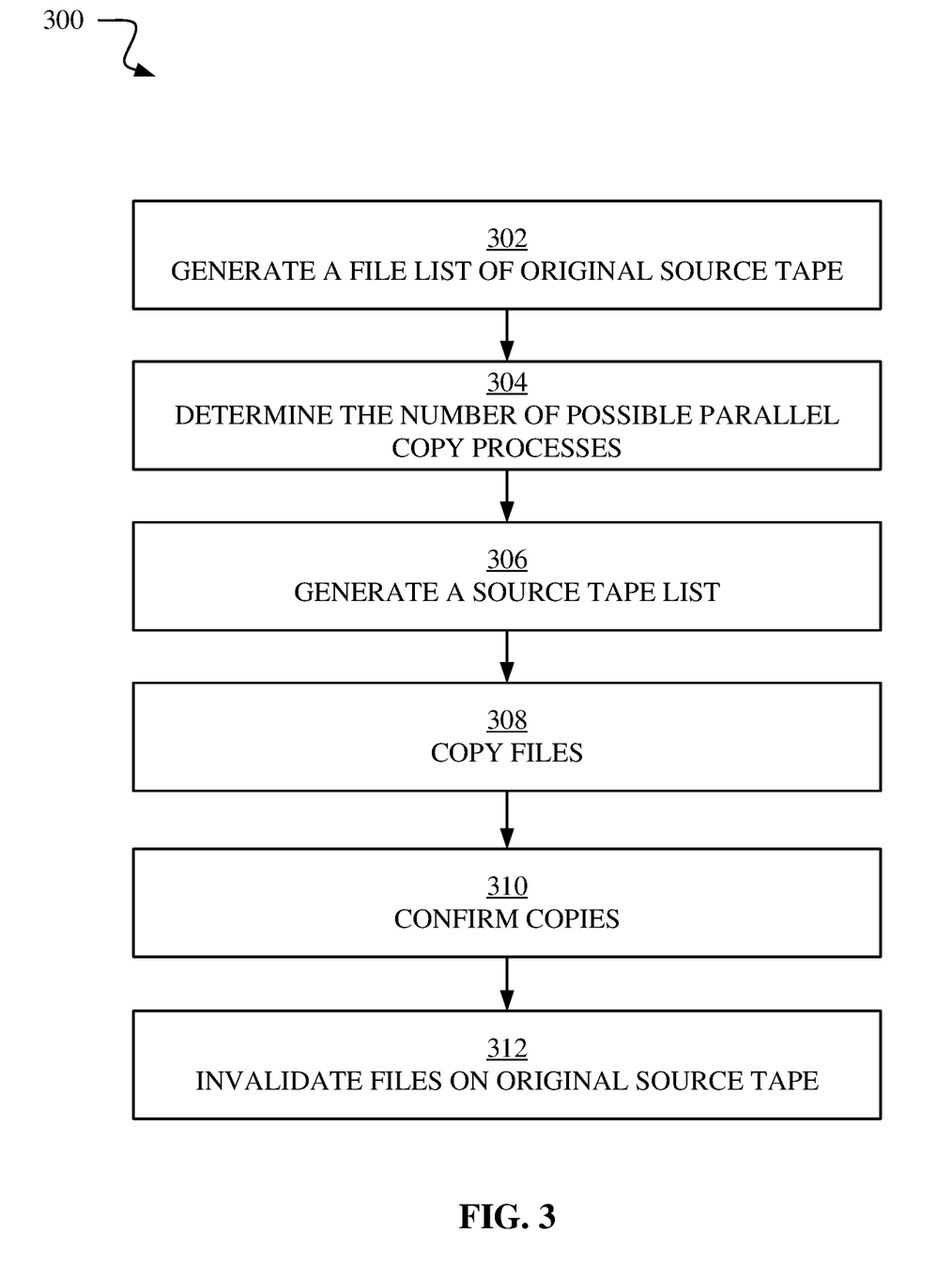
FIG. 3 is a process flow chart of a method for copying a tape, in accordance with some embodiments of the present disclosure.

FIG. 3 is a process flow chart of a method 300 for copying a tape, in accordance with some embodiments of the present disclosure. In some embodiments, the tape copy manager 116 can perform the method 300 in response to a request to reclaim an original source tape for re-use, e.g., by performing a data migrate command. The original source tape can be similar to the tapes 206 described with respect to FIG. 2.

At operation 302, the tape copy manager 116 can generate an original file list of the original source tape. The original file list can include all valid files of the original source tape. Additionally, the tape copy manager 116 can include in the original file list, the tapes where copies of the files are stored. In some embodiments, the tape copy manager 116 uses a file index hosted on disk that records the tape locations, e.g., as a file attribute. Alternatively, the tape copy manager 116 can use a tape location database, such as the tape location database 114.

At operation 304, the tape copy manager 116 can determine the number of possible parallel copy processes (e.g., copies). The number of parallel copies possible may be limited by the availability of tape drives, such as the tape drives 106. Accordingly, in some embodiments of the present disclosure, the tape copy manager 116 can determine the number of tape drives 106 available without mounted tapes. Because a copy involves two different tapes on two different tape drives 106, the tape copy manager 116 can divide this number by two, and round down to determine the number of possible copies, referred to herein as N.

At operation 306, the tape copy manager 116 can generate a source tape list. Thus, the tape copy manager 116 can use the tapes in the source tape list to copy the files in parallel. Generating the source tape list is described in greater detail with respect to FIG. 4.

At operation 308, the tape copy manager 116 can copy the files on the original file list in N parallel processes. In some embodiments of the present disclosure, tape copy manager 116 can identify the number of files to copy on each of the available tape drives. Further, the tape copy manager 116 can make requests to the data storage system 108 to direct the tape drives 106 to perform the parallel copies.

At operation 310, the tape copy manager 116 can confirm the copies. Confirming the copies can involve making a determination that the data storage system 108 copied each of the files successfully. If the files are not copied successfully, the method 300 may end.

At operation 312, the tape copy manager 116 can invalidate the files on the original source tape. Invalidating the files can involve deleting (or marking for deletion) all the files. In this way, the tape copy manager 116 can make the original source tape available for reuse.

Figure 4:
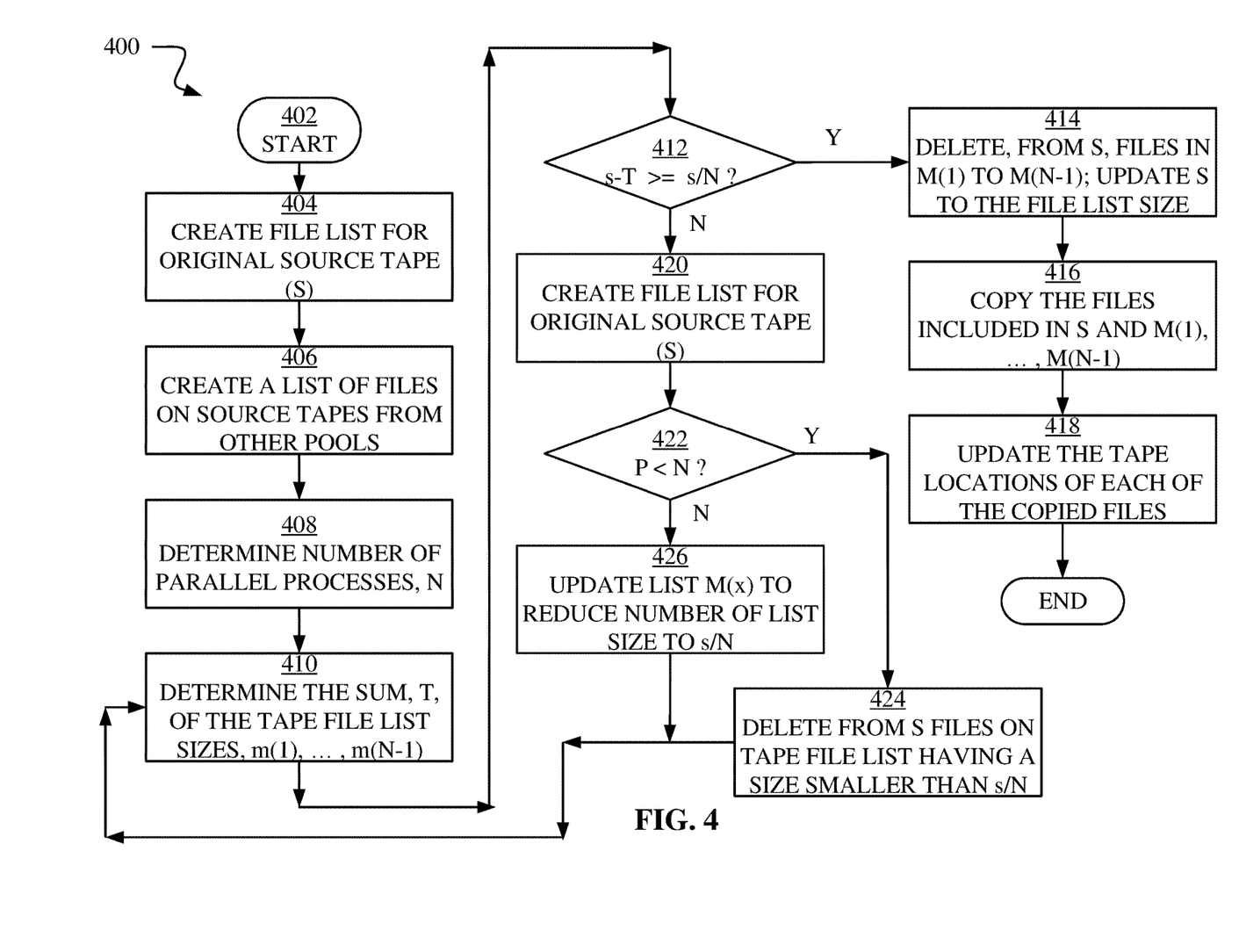
FIG. 4 is a process flow chart of a method for copying a tape, in accordance with some embodiments of the present disclosure.

FIG. 4 is a process flow chart of a method 400 for copying a tape, in accordance with some embodiments of the present disclosure. In some embodiments, the tape copy manager 116 can perform the method 400 in response to a request to reclaim or data migrate an original source tape, such as a tape 206, described with respect to FIG. 2. The method 400 involves selecting the tapes 206 for copying the files identified in the original file list. The method 400 may start at operation 402.

At operation 404, the tape copy manager 116 can create the original file list for the original source tape (S). The original file list can include the valid files recorded on S. Further, for each of the files listed, the tape copy manager 116 can determine which tapes store a copy of the file. In some embodiments, the tape copy manager 116 makes this determination using metadata stored on a disk storage device. Additionally, tape copy manager 116 can generate an original file list (e.g., tape file list) for each of the tapes identified in the original file list for S (e.g., source tapes). In some embodiments, the tape copy manager 116 can sort the tape file lists in order of the positions at which each of the files are recorded on the tape. In some embodiments, the tape copy manager 116 can determine the positions at which the files are recorded on the tape, using an index.

At operation 406, the tape copy manager 116 can create a list of files on source tapes from other pools. Because some of the source tapes may be in different pools from the original source tape, the tape copy manager 116 can identify files that can be copied from these different pools. In this way, the tape copy manager 116 can ensure that different files are copied from both the source tapes and the original source tape.

In some embodiments of the present disclosure, second and third tapes on which the same files are recorded may not be the same. This may result from the designation of the storage destination during migrations that use a pool, not a specific tape. Therefore, copies of the files recorded on the original source tape may be recorded on multiple tapes in the same pool. Thus, if the copies of the files on original source tape A are also on tape B, there are two tapes in the data storage system 108 available for performing a data migrate command of the original source tape, i.e., N=2.

At operation 408, the tape copy manager 116 can determine the number of parallel processes, N. In order to copy the files directly from the source tape to the target tapes (e.g., copy destination tapes), the data storage system 108 can use two drives for one copy process. Thus, if a total of five tape drives are usable, the data storage system 108 can perform two (N=2) copy processes in parallel. Similarly, if eight drives are usable, the data storage system 108 can perform four (N=4) copy processes in parallel.

For tapes belonging to a pool that is different from the pool that the original source tape belongs to, the tape copy manager 116 can sequentially select N−1 tape lists in descending order of size (e.g., by the number of files listed). However, if the total number of tape lists is smaller than N−1, the tape copy manager 116 can increment the value of N by one to the total number of tapes 112. For example, for ten tape drives 106, N=5. However, there may only be two tapes 112 that have copies of the files from the original source tape. Thus, 2<4 (=N−1). As such, N=2+1=3. Thus, the tape copy manager 116 can perform the data migrate using 3 parallel processes involving the original source tape plus two tapes from a different pool 110.

As stated previously, S can represent the original file list for the original source tape. Further, s can represent the size of S. Accordingly, each of the sizes of the tape file lists can be equal to or less than s. Herein, the tape file lists are referred to as, M(1), M(2) . . . M(N−1), and their respective sizes as, m(1), m(2), . . . , m(N−1).

At operation 410, the tape copy manager 116 can determine the sum, T, of the tape file list sizes, m(1), . . . , m(n−1). The sum, T, is represented in EXAMPLE EQUATION 1:

$$T=m(1)+m(2)+\ldots+m(N-1) \quad \text{EXAMPLE EQUATION 1}$$

At operation 412, the tape copy manager 116 can determine if s−T>=s/N. The term, s−T, represents the total number of files in the original file list minus the total number of files in other pools. Further, s/N represents the number of parallel copies that the tape copy manager 116 performs to copy all the files on the original file list. Thus, if the files to be copied from the original source tape are greater than the number of parallel copies that the tape copy manager 116 performs for all the files, method 400 can flow to operation 414.

At operation 414, the tape copy manager 116 can delete, from S, the files included in lists M(1) to M(N−1), and update s to the new size of the original file list.

At operation 416, the tape copy manager 116 can use the N lists to copy the files included in the respective lists, S and M(1), . . . , M(N−1), from the respective source tapes to copy destination tapes. Accordingly, by using the method 400, the tape copy manager 116 can reduce the time involved in copying all the valid files recorded on the original source tape. This reduced time can result from the time involved in copying, in parallel, an approximately equally divided number of parallel processes. However, in the scenario where s−T>s/N, there may not be an approximately equally divided result. As such, the tape copy manager 116 can copy files from tapes 112 in different pools as much as possible, e.g., T. However, s is larger than s/N (i.e. equally divided size), meaning the result is better than the conventional method (i.e. copy all files from one tape) but not better than the approximately equally divided case.

At operation 418, the tape copy manager 116 can update the tape locations of each of the copied files. In some embodiments, the tape copy manager 116 can update these locations as attributes of a file index. Alternatively, the tape copy manager 116 can update the tape locations in a tape location database 114.

For example, where FILE A is recorded on tape 206-A1, which is the original source tape, and a copy of file A is recorded on tape 206-B1 in a different pool, the tape copy manager 116 can record the updated tape locations as tape 206-B1 in an attribute of FILE A stored on disk.

Further, even if FILE A is copied from tape 206-B1 to tape 206-A2 using the methods 300, 400 for tape 206-A1, the tape copy manager 116 can delete the information about tape 206-A1 storing FILE A, and update the attribute representing the tape location, to tape 206-A2. Accordingly, the file attributes can indicate copies of FILE A are recorded on tapes 206-A2 and 206-B1. Using the N lists created in the preceding step, the files included in the respective lists are copied from the respective source tapes to the relevant copy destination tapes.

If, at operation 412, the tape copy manager 116 can determine that s−T is not >=s/N, control can flow to operation 420.

At operation 420, the tape copy manager 116 can determine the number, P, of lists M larger than s/N. Thus, P can represent the number of tape file lists whose sizes are larger than s/N. Further, the sum of sizes of the P lists can be represented as p. Additionally, the sum of the sizes of the remaining lists (N−1−P) can be represented as q.

At operation 422, the tape copy manager 116 can determine if P<N. If P<N, there is a list having a size that is smaller than s/N. Accordingly, the method 400 can flow to operation 424.

At operation 424, the tape copy manager 116 can delete, from S, the files listed on the tape file list having a size that is smaller than s/N. Further, based on taking s=s−q and N=P+1, the method 400 can flow to operation 410.

However, if P is not <N, the method 400 can flow to operation 426. If P not less than N, then P can equal N, meaning all the lists have a size that is larger than s/N.

Accordingly, at operation 426, the tape copy manager 116 can update list M(x) to reduce the number of list size to s/N. For each of lists M(1) to M(N−1), the tape copy manager 116 can validate the top s/N (e.g., rounded down if not a whole number) files and delete the rest of the files. Further, the tape copy manager 116 can perform operation 412 again using the updated lists M(1) to M(N−1). In some embodiments of the present disclosure, the tape copy manager 116 can repeat operations 410 through 426 until the tape copy manager 116 determines that s−T>=s/N at operation 412.

For example, an original source tape, A, can store files 1 to 1,000,000 each having a number as a file name; all the files are valid; and the files are recorded in numerical order on tape A. Thus, the size, s, of the original file list, S, is equal to 1,000,000.

Also, the files 1 to 1,000,000 can be stored on tapes belonging to a different pool than the original source tape, as shown in EXAMPLE TABLE 1:

In this example, the number of possible parallel copies, N, may be 4.

EXAMPLE TABLE 1

| | Tape | | | |
|---|---|---|---|---|
| | TapeB | TapeC | TapeD | TapeE |
| Files | 1-100,000 300,001- 330,000 500,001- 800,000 | 100,001- 300,000 | 800,001- 900,000 1,000,000 | 330,001- 500,000 900,001- 999,999 |
| Size | 430,000 files | 200,000 files | 100,001 files | 269,999 files |

Accordingly, the tape copy manager 116 can select N−1 tape file lists belonging to the other pools in descending order of size. As such, M(1) is tape B, M(2) is tape E, and M(3) is tape C. Further, the sizes of the lists are m(1)=430,000, m(2)=269,999, and m(3)=200,000, respectively.

Based on T=m(1)+m(2)+m(3)=899,999, s−T=100,001 and s/N=250,000, s−T<s/N, the tape copy manager 116 can perform operations 412 through 426 as described above. Accordingly, the tape copy manager 116 can determine P (the number of original file lists M(x) having a size larger than s/N=250,000)=2. As such, the sum of the sizes of the P lists p=m(1)+m(2)=699,999. Further, the sum of the sizes of the remaining lists, q=m(3)=200,000

Since P<N, the tape copy manager 116 can delete from the original file list, S, the files in list M(3). The resultant tape file lists are shown in EXAMPLE TAPE FILE LISTS 1:

EXAMPLE TAPE FILE LISTS 1

| | List | | | |
|---|---|---|---|---|
| | S | M(1) | M(2) | M(3) |
| | Tape | | | |
| | TapeA | TapeB | TapeE | TapeC |
| Files | 1-100,000, 300,001- 1,000,000 | 1-100,000 300,001- 330,000 500,001- 800,000 | 330,001- 500,000 900,001- 999,999 | 100,001- 300,000 |
| Size | 800,000 | 430,000 | 269,999 | 200,000 |

The size of list S is updated to s=s−m(3)=800,000 and the number of parallel processes is updated to N=P+1=3. Further, the tape copy manager 116 can repeat operation 412.

Because T=m(1)+m(2)=699,999, s−T=100,001 and s/N=266,666, s−T<s/N. Accordingly, the method 400 flows to operation 420, where the tape copy manager 116 can determine that lists m(1) and m(2) are both larger than s/N=266,666. As such, P=N. Therefore, the tape copy manager 116 can perform operation 424, to delete the files from M(1) and M(2) in excess of s/N. The resultant tape file lists are shown in EXAMPLE TAPE FILE LISTS 2:

EXAMPLE TAPE FILE LISTS 2

| | List | | | |
|---|---|---|---|---|
| | S | M(1) | M(2) | M(3) |
| | Tape | | | |
| | TapeA | TapeB | TapeE | TapeC |
| Files | 1-100,000, 300,001- 1,000,000 | 1-100,000 300,001- 330,000 500,001- 636,666 | 330,001- 500,000 900,001- 996,666 | 100,001- 300,000 |
| Size | 800,000 | 266,666 | 266,666 | 200,000 |

Upon repeating operation 412, the tape copy manager 116 can determine that T=m(1)+m(2)=533,332; s−T=266,668; thus, s−T>s/N. Accordingly, the tape copy manager 116 can perform operation 414, removing the files in the tape file lists M(1) through M(3) from S. The resultant tape file lists are shown in EXAMPLE TAPE FILE LISTS 3:

EXAMPLE TAPE FILE LISTS 3

| | List | | | |
|---|---|---|---|---|
| | S | M(1) | M(2) | M(3) |
| | Tape | | | |
| | TapeA | TapeB | TapeE | TapeC |
| Files | 636,667- 900,000 996,667- 1,000,000 | 1-100,000 300,001- 330,000 500,001- 636,666 | 330,001- 500,000 900,001- 996,666 | 100,001- 300,000 |
| Size | 266,668 | 266,666 | 266,666 | 200,000 |

Accordingly, the tape copy manager 116 can perform operation 416, copying tapes A, B, C, and E, in parallel, to a designated copy destination pool. In this way, the tape copy manager 116 can make a copy of all the files on the original source tape. Further, the tape copy manager 116 can perform operations 418 and 420, thus making the original source tape available for re-use.

Figure 5:
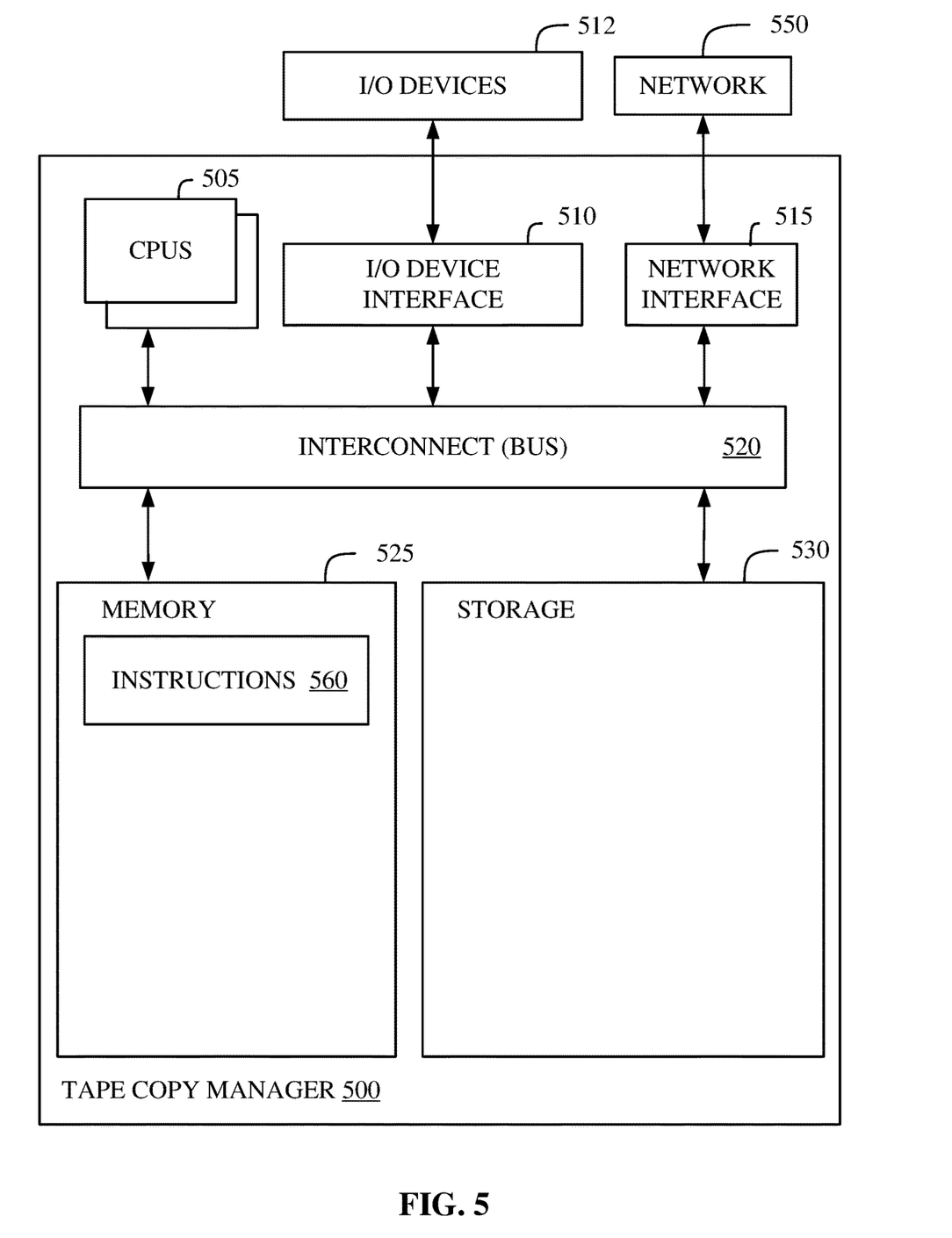
FIG. 5 is a block diagram of an example tape copy manager, in accordance with some embodiments of the present disclosure.

FIG. 5 is a block diagram of an example tape copy manager 500, in accordance with some embodiments of the present disclosure. In various embodiments, the tape copy manager 500 is similar to the tape copy manager 116 and can perform the methods described in FIGS. 3 and 4 and/or the functionality discussed in FIGS. 1 and 2A-2B. In some embodiments, the tape copy manager 500 provides instructions for the aforementioned methods and/or functionalities to a client machine such that the client machine executes the method, or a portion of the method, based on the instructions provided by the tape copy manager 500. In some embodiments, the tape copy manager 500 comprises software executing on hardware incorporated into a plurality of devices.

The tape copy manager 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, and/or flash memory devices. Additionally, the storage 530 can include storage area-network (SAN) devices, the cloud, or other devices connected to the tape copy manager 500 via the I/O device interface 510 or to a network 550 via the network interface 515.

In some embodiments, the memory 525 stores instructions 560. However, in various embodiments, the instructions 560 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all, any of the methods described in FIGS. 3 and 4 and/or the functionality discussed in FIGS. 1 and 2A-2B.

In various embodiments, the I/O devices 512 include an interface capable of presenting information and receiving input. For example, I/O devices 512 can present information to a listener interacting with tape copy manager 500 and receive input from the listener.

The tape copy manager 500 is connected to the network 550 via the network interface 515. Network 550 can comprise a physical, wireless, cellular, or different network.

In some embodiments, the tape copy manager 500 can be a multi-user mainframe computer system, a single-user system, or a server computer or similar device that has little or no direct user interface but receives requests from other computer systems (clients). Further, in some embodiments, the tape copy manager 500 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary tape copy manager 500. In some embodiments, however, individual components can have greater or lesser complexity than as represented in FIG. 5, components other than or in addition to those shown in FIG. 5 can be present, and the number, type, and configuration of such components can vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   a computer processing circuit; and
   a computer-readable storage medium storing instructions, which, when executed by the computer processing circuit, are configured to cause the computer processing circuit to perform a method comprising:
   generating a file list of an original source tape, wherein the file list identifies a plurality of files that are stored on the original source tape;
   determining a number of possible parallel copies for a data storage system having a plurality of tape drives;
   generating a plurality of tape file lists, wherein each of the tape file lists identify a plurality of copies of the plurality of files stored on one of a plurality of source tapes; and
   generating a new plurality of copies of the plurality of files by copying, in parallel, a subset of the plurality of files, and a subset of the plurality of copies, based on the tape files lists, and using a first of the plurality of tape drives, and a second of the plurality of tape drives.

2. The system of claim 1, the method further comprising:
   confirming that generating the new plurality of copies is performed successfully; and
   invalidating the plurality of files on the original source tape.

3. The system of claim 2, the method further comprising updating a tape location database indicating a plurality of new destination tapes for the plurality of files based on generating the new plurality of copies.

4. The system of claim 1, wherein the number of possible parallel copies is determined by dividing a number of the plurality of tape drives by two, and rounding down.

5. The system of claim 4, wherein a number of the subset of the plurality of files is equal to a number of the plurality of files divided by the number of possible parallel copies.

6. The system of claim 5, the method further comprising determining the subset of copies by selecting a subset of the tape file lists in sequential descending order.

7. The system of claim 6, wherein a number of the selected subset of tape file lists is equal to the number of possible parallel copies minus one.

8. The system of claim 7, wherein the source tapes are stored in a different pool than the original source tape.

9. A method comprising:
   generating a file list of an original source tape, wherein the file list identifies a plurality of files that are stored on the original source tape;
   determining a number of possible parallel copies for a data storage system having a plurality of tape drives;
   generating a plurality of tape file lists, wherein each of the tape file lists identify a plurality of copies of the plurality of files stored on one of a plurality of source tapes;
   generating a new plurality of copies of the plurality of files by copying, in parallel, a subset of the plurality of files, and a subset of the plurality of copies, based on the tape files lists, and using a first of the plurality of tape drives, and a second of the plurality of tape drives;
   confirming that generating the new plurality of copies is performed successfully; and
   invalidating the plurality of files on the original source tape.

10. The method of claim 9, the method further comprising updating a tape location database indicating a plurality of new destination tapes for the plurality of files based on generating the new plurality of copies.

11. The method of claim 9, wherein the number of possible parallel copies is determined by dividing a number of the plurality of tape drives by two, and rounding down.

12. The method of claim 11, wherein a number of the subset of the plurality of files is equal to a number of the plurality of files divided by the number of possible parallel copies.

13. The method of claim 12, the method further comprising determining the subset of copies by selecting a subset of the tape file lists in sequential descending order.

14. The method of claim 13, wherein a number of the selected subset of tape file lists is equal to the number of possible parallel copies minus one.

15. The method of claim 14, wherein the source tapes are stored in a different pool than the original source tape.

16. A computer program product comprising one or more computer readable storage media, and program instructions collectively stored on the one or more computer readable storage media, the program instructions comprising instructions configured to cause one or more processors to perform a method comprising:

generating a file list of an original source tape, wherein the file list identifies a plurality of files that are stored on the original source tape;

determining a number of possible parallel copies for a data storage system having a plurality of tape drives;

generating a plurality of tape file lists, wherein each of the tape file lists identify a plurality of copies of the plurality of files stored on one of a plurality of source tapes; and generating a new plurality of copies of the plurality of files by copying, in parallel, a subset of the plurality of files, and a subset of the plurality of copies, based on the tape files lists, and using a first of the plurality of tape drives, and a second of the plurality of tape drives;

confirming that generating the new plurality of copies is performed successfully;

invalidating the plurality of files on the original source tape; and updating a tape location database indicating a plurality of new destination tapes for the plurality of files based on generating the new plurality of copies.

17. The computer program product of claim 16, wherein the number of possible parallel copies is determined by dividing a number of the plurality of tape drives by two, and rounding down.

18. The computer program product of claim 17, wherein a number of the subset of the plurality of files is equal to a number of the plurality of files divided by the number of possible parallel copies.

19. The computer program product of claim 18, the method further comprising determining the subset of copies by selecting a subset of the tape file lists in sequential descending order.

20. The computer program product of claim 19, wherein a number of the selected subset of tape file lists is equal to the number of possible parallel copies minus one.

\* \* \* \* \*